US012462470B2

(12) United States Patent
Faulkner

(10) Patent No.: US 12,462,470 B2
(45) Date of Patent: Nov. 4, 2025

(54) ADAPTIVE ADJUSTMENTS OF PERSPECTIVE VIEWS FOR IMPROVING DETAIL AWARENESS FOR USERS ASSOCIATED WITH TARGET ENTITIES OF A VIRTUAL ENVIRONMENT

(71) Applicant: MICROSOFT TECHNOLOGY LICENSING, LLC, Redmond, WA (US)

(72) Inventor: Jason Thomas Faulkner, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/891,111

(22) Filed: Aug. 18, 2022

(65) Prior Publication Data
US 2024/0062457 A1  Feb. 22, 2024

(51) Int. Cl.
*G06T 15/20* (2011.01)
(52) U.S. Cl.
CPC .......... *G06T 15/20* (2013.01); *G06T 2200/24* (2013.01)
(58) Field of Classification Search
CPC ..... G06T 15/20; G06T 2200/24; G06T 15/00; G06T 19/003; H04N 7/157
See application file for complete search history.

(56) References Cited

U.S. PATENT DOCUMENTS 6,335,765 B1  1/2002  Daly et al.
7,701,463 B2  4/2010  Cochran
(Continued)

FOREIGN PATENT DOCUMENTS

CN  112235530 B  7/2021
WO  2015039239 A1  3/2015
(Continued)

OTHER PUBLICATIONS

"International Search Report and Written Opinion issued in PCT Application No. PCT/US2023/027751", Mailed Date: Nov. 2, 2023, 15 Pages.
(Continued)

*Primary Examiner* — Jin Cheng Wang
(74) *Attorney, Agent, or Firm* — Scott Y. Shigeta; Newport IP, LLC

(57) ABSTRACT

A system provides adaptive adjustments of perspective views for improving detail awareness for users associated with target entities of a virtual environment. A system can generate customized three-dimensional 3D views for each individual user participating in a communication session. The system can generate customized three-dimensional views for each individual user without making modifications to a 3D model of a virtual environment so a 3D environment can be maintained while each participant may have adjusted angles and positions for various virtual objects. The system can adaptively adjust an angle or position for entities in a viewing perspective or change a dimension of a perspective view for a target entity. The adjustments can be according to each viewer's point of view to maximize detail awareness for each participant of a communication session. These adjustments can be made while at the same time, maintaining attendees arranged in a specific spatial relationship without changes.

20 Claims, 13 Drawing Sheets

(56) References Cited

U.S. PATENT DOCUMENTS

| | | | |
|---|---|---|---|
| 8,675,067 B2 | 3/2014 | Chou et al. | |
| 9,959,676 B2 | 5/2018 | Barzuza et al. | |
| 11,087,548 B2* | 8/2021 | Bennett | G06T 13/20 |
| 11,095,856 B2 | 8/2021 | Valli | |
| 11,145,126 B1* | 10/2021 | Bramwell | G06F 3/147 |
| 11,321,929 B2* | 5/2022 | Huo | H04L 67/12 |
| 11,422,669 B1* | 8/2022 | Ravasz | G06F 3/013 |
| 11,816,757 B1* | 11/2023 | Summers | G06F 3/012 |
| 2013/0194304 A1* | 8/2013 | Latta | G09G 3/003 345/633 |
| 2014/0368537 A1 | 12/2014 | Kipman et al. | |
| 2015/0215351 A1 | 7/2015 | Wiener et al. | |
| 2017/0358140 A1* | 12/2017 | Kohler | G02B 27/0172 |
| 2018/0321894 A1* | 11/2018 | Paulovich | G06F 3/1454 |
| 2019/0108683 A1 | 4/2019 | Valli et al. | |
| 2019/0297304 A1 | 9/2019 | Li | |
| 2021/0089475 A1* | 3/2021 | Mathur | G06F 13/1642 |
| 2021/0090315 A1* | 3/2021 | Gladkov | G06F 9/45512 |
| 2021/0350604 A1* | 11/2021 | Pejsa | G06F 3/012 |
| 2022/0028094 A1* | 1/2022 | Bleyer | G06T 5/73 |
| 2022/0028095 A1* | 1/2022 | Bleyer | G06T 19/006 |
| 2022/0051412 A1* | 2/2022 | Gronau | G06V 40/172 |
| 2022/0239887 A1* | 7/2022 | Estee | H04N 13/194 |
| 2023/0008125 A1* | 1/2023 | Hellge | G06T 15/04 |
| 2023/0054805 A1* | 2/2023 | Li | G06F 3/011 |
| 2023/0254449 A1* | 8/2023 | Shirai | H04N 7/157 715/757 |
| 2023/0381670 A1* | 11/2023 | Black | G06F 3/011 |
| 2024/0029339 A1* | 1/2024 | Krol | H04N 7/157 |

FOREIGN PATENT DOCUMENTS

| | | |
|---|---|---|
| WO | 2018005235 A1 | 1/2018 |
| WO | 2019145534 A1 | 8/2019 |

OTHER PUBLICATIONS

"Introducing Horizon Workrooms: Remote Collaboration Reimagined", Retrieved from: https://about.fb.com/news/2021/08/introducing-horizon-workrooms-remote-collaboration-reimagined/, Aug. 19, 2021, 10 Pages.

Kauff, et al., "An Immersive 3D Video-Conferencing System using Shared Virtual Team User Environments", In Proceedings of the 4th International Conference on Collaborative Virtual Environments, Sep. 30, 2002, pp. 105-112.

* cited by examiner

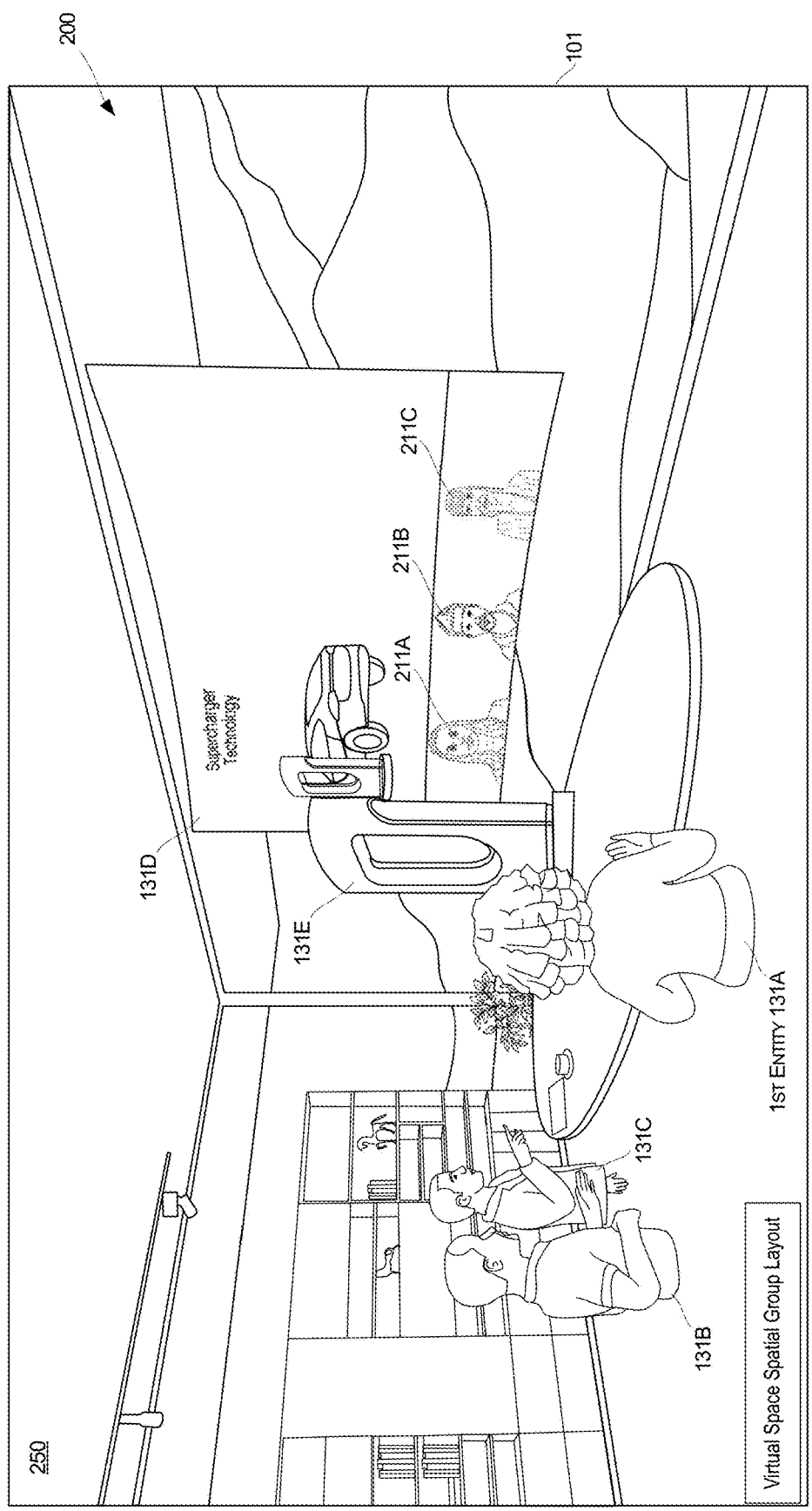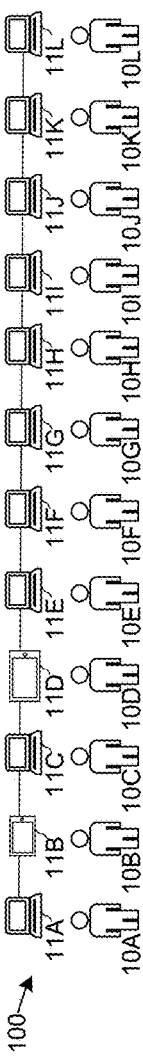
FIGURE 2

ADAPTIVE ADJUSTMENTS OF PERSPECTIVE VIEWS FOR IMPROVING DETAIL AWARENESS FOR USERS ASSOCIATED WITH TARGET ENTITIES OF A VIRTUAL ENVIRONMENT

BACKGROUND

The use of meta-verse environments for on-line meeting applications is becoming ubiquitous. Participants of online meetings now meet in three-dimensional virtual environments and share content within those virtual environments. Despite a number of benefits over other forms of collaboration, the use of 3D environments for sharing content can raise a number of drawbacks.

When meeting in 3D immersive virtual environments, depending on positions of users and a virtual camera position, it may be hard to see presented content, a part of virtual object, user activity, user gestures, or facial expressions. Important information and social signals, which can be from facial gestures or body language, communicated in a meeting may be obscured or blocked depending on a position of a person's avatar. In one example, a virtual object positioned in the foreground may obscure important visual details of a virtual object positioned in the background.

In another example, when a group of users have avatars that are positioned around a virtual computer screen, not all users can share the same experience, as some user avatars may be positioned in front of the virtual computer screen while other user avatars may be positioned near the side of the virtual computer screen. The users having avatars positioned near the side of the virtual computer screen may miss salient information given that renderings on the virtual computer screen may appear to be compressed. Further, when meeting across 2D and 3D virtual environments across devices, users having avatars that are positioned near the side of the virtual computer screen may miss details of 2D displays of desktop users.

These shortcomings can lead to ineffective interactions between a computing device and a user. In addition, the above-described shortcomings of existing systems can lead to a loss in user engagement. Computing devices that do not promote user engagement, or worse, contribute to a loss of user engagement, can lead to production loss and inefficiencies with respect to a number computing resources. For instance, when a user becomes fatigued or disengaged, that user may need to refer to other resources, such as documents or participate in other forms of communication, when shared content is missed or overlooked. Missed content may need to be re-sent when viewers miss salient points or cues during a live meeting. Such activities can lead to inefficient or duplicative use of a network, processor, memory, or other computing resources. Thus, there is an ongoing need to develop improvements to help make the user experience more like an in-person meeting and more engaging. In addition, when information in meta-verse environments is not displayed correctly, some content that is supposed to be hidden from some users can be inadvertently exposed when such content is displayed on virtual objects, such as a virtual screen.

SUMMARY

The techniques disclosed herein provide adaptive adjustments of perspective views for improving detail awareness for users associated with target entities of a virtual environment. A system can generate customized three-dimensional 3D views for each individual user participating in a communication session. The system can generate customized three-dimensional views for each individual user without making modifications to a 3D model of a virtual environment. This allows a system to maintain a 3D environment while each participant may have adjusted angles and positions for various virtual objects. For illustrative purposes, virtual objects are also referred to herein as "entities," and each entity can be an avatar, virtual furniture, virtual screens for shared content, or virtual cameras for generating perspective views of a virtual environment. Some entities can be associated with a perspective view and a point of view, such as when an entity is an avatar representing an end user, or some entities may not be associated with a perspective view and a point of view, such as when an entity is in the form of a virtual display screen, virtual furniture, a boundary wall, etc. In some configurations, the system can adaptively adjust an angle or a position of entities positioned within a perspective view of a target entity. Thus, virtual objects in the view of an avatar can appear in optimized positions to help the display of content to the user controlling the avatar. The adjustment can include changing a viewing angle of a virtual object such as a virtual screen, e.g., a virtual screen in the avatar's view can appear to be rotated for certain users. The adjustment can also include changing the position of the virtual object, e.g., a virtual screen in the avatar's view can appear to be in a more centered position for certain users. The adjustment can also include changing a zoom level for certain users. The adjustments can be according to each user's point of view to maximize detail awareness for each participant of a communication session. These adjustments can be made while at the same time, maintaining attendees and other entities arranged in a specific spatial relationship without changes.

The adaptive adjustments of perspective views can provide a number of technical benefits for computing systems. For instance, by providing adaptive adjustments of perspective views, each user of a communication session can see more equal views of the same shared content. This benefit can promote user engagement help a system to reduce user fatigue. By reducing user fatigue, particularly in a communication system, users can more effectively exchange information. This helps mitigate occurrences where shared content is missed or overlooked. This can reduce occurrences where users need to re-send information. More effective communication of shared content can also help avoid the need for external systems, such as mobile phones for texting and other messaging platforms. The system and features described herein can also help reduce the duplicative use of network, processor, memory, or other computing resources.

The features disclosed herein also provide a number of improvements for the security of a system. When system permissions are set to restrict a person from seeing certain content, that content may further obscured by turning that content away from a user instead of turning the content toward a user. In addition, permission for controlling access to view data is also provided to prevent other users from seeing a person's selection of entities, content of interest, viewing preferences, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2 shows an example of a rendering of a perspective view from a point of view of a virtual camera using original model data.

DETAILED DESCRIPTION

Figure 1A:
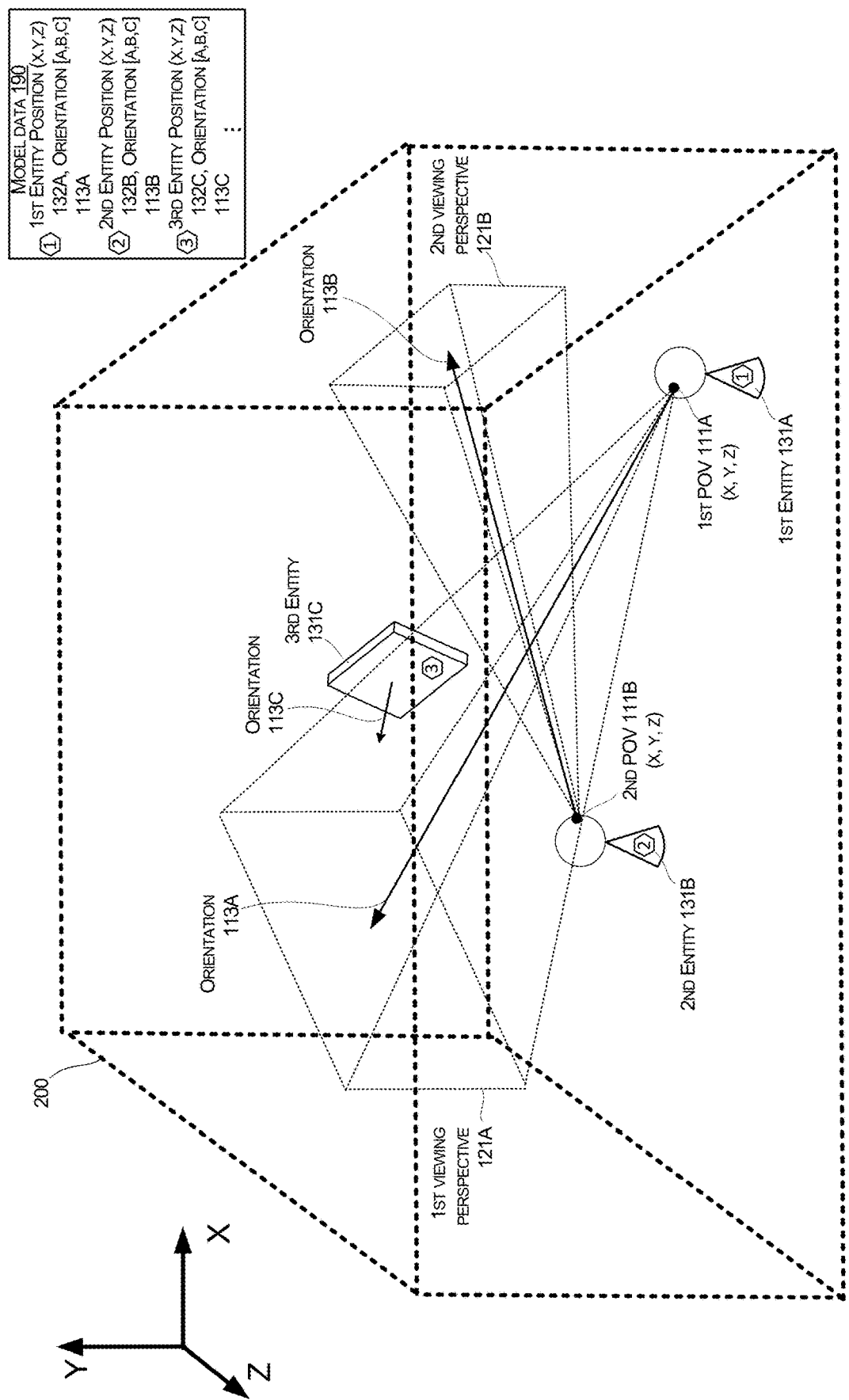
FIG. 1A shows a state of a virtual environment prior to the selection of an entity.
Figure 1B:
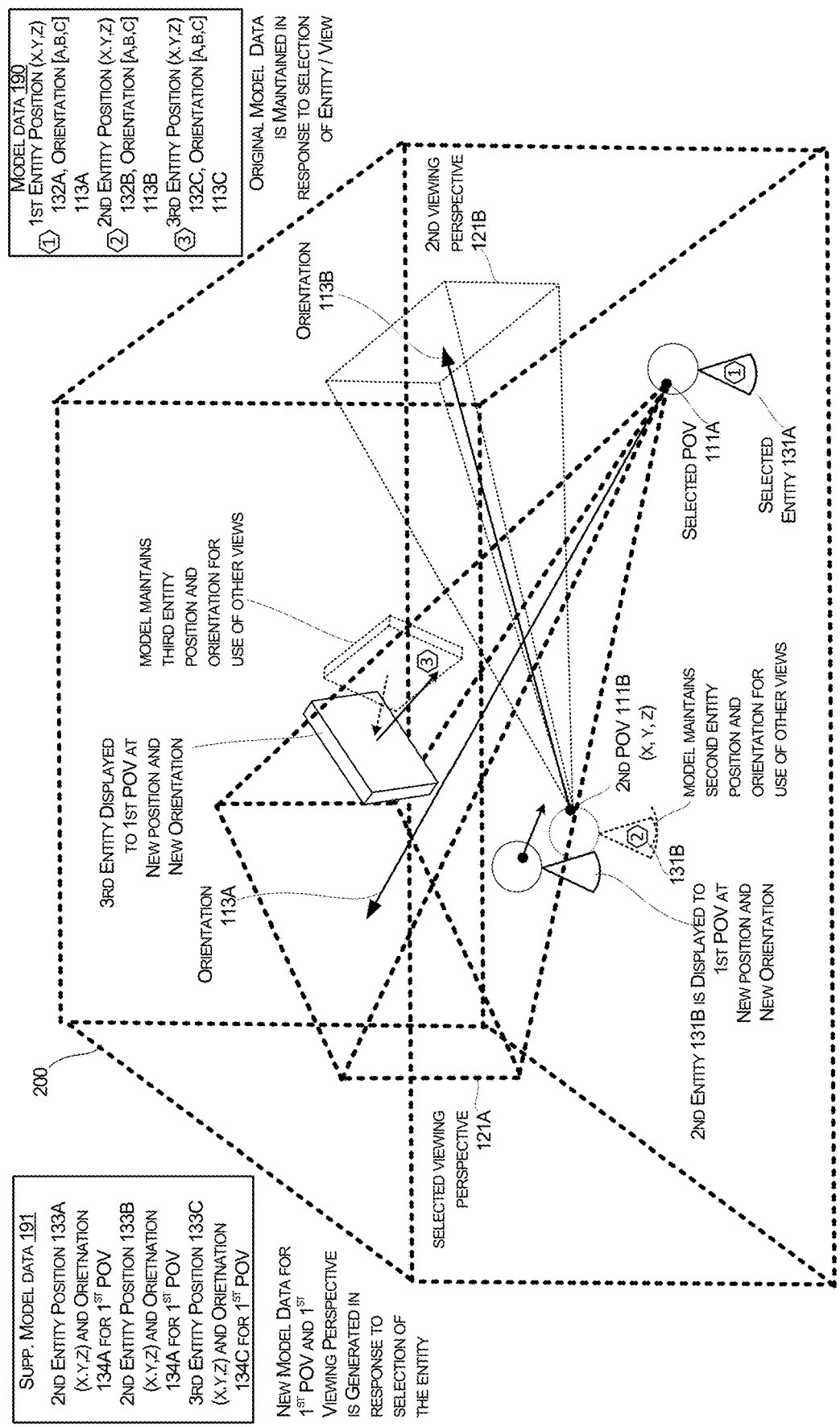
FIG. 1B shows a state of a virtual environment after the selection of an entity.

FIGS. 1A and 1B illustrates aspects of a process for adjusting a viewing perspective of a 3D environment in response to a selection of a target entity from a plurality of entities positioned within the 3D environment. FIG. 1A shows aspects of virtual environment 200 that includes a number of entities. In this example, there are three entities 131: a first entity 131A is in the form of an avatar that represents a first participant of a communication session, a second entity 131B is in the form of an avatar that represents a second participant of a communication session, and a third entity 131C that is in the form of a virtual display screen. As shown, each entity has a location in the 3D environment 200, which may be based on coordinates, and each entity has an orientation, which is represented as a vector originating from a point on the entity, such as a point of view that is at the location of an avatar's eyes. The point of view may also be associated with a location in the 3D environment. In some configurations, an orientation vector 113 can indicate which direction an entity is facing. In this example, the first orientation vector 113A shows the direction that the first entity 131A is facing, the second orientation vector 113B shows the direction that the second entity 131B is facing, and the third orientation vector 113C shows the direction that the third entity 131C is facing. An orientation vector 113 for an entity can also be referred to as an "original orientation" of the entity that is based on the original model data 190.

Also shown, model data 190, also referred to herein as the original model data 190 or a data structure 190, can define positions and orientations for a plurality of entities 131. An entity can be a virtual object such as an avatar representing a user or an entity can be another type of virtual object, such as a virtual television screen, virtual furniture, a virtual camera, etc. A virtual camera is similar to an avatar in that it may have a position, orientation and a viewing perspective but it may not have a displayable entity, e.g., it may be an invisible virtual camera. The model data 190 can also define viewing perspectives 121 that originate from a point of view 111 for an individual entity. The viewing perspectives 121 extend in a direction with the orientation vector and each viewing perspective 121 can have dimensions, such as a width or height, that increase in size as a distance from the point of view increases. The model data can also define physical characteristics of each entity, such as size, shape, surface patterns, etc.

In one example, an entity can be an avatar or representation of a user. The point of view 111 can be at a specific location relative to an entity, such as a point of where the eyes of an avatar are located. The viewing perspective 121 of an entity can project from the point of view 111, and the viewing perspective 121 can be used to generate a rendering that is displayed to the user controlling the avatar. The system can display entities of a 3D environment 200 based on the location and orientation the avatar as well as the position of entities that are positioned within the viewing perspective 121. In the example of FIG. 1A, the first entity 131A has a viewing perspective 121A that follows the direction of the orientation vector 113A. A rendering of the viewing perspective 121A can include any entity that is within the viewing perspective 121A, such as the second entity 131B and the third entity 131C. A rendering of a viewing perspective 121A can be a 2D image that is generated using any suitable projection technique that captures images from the first point of view 111A.

Figure 3:
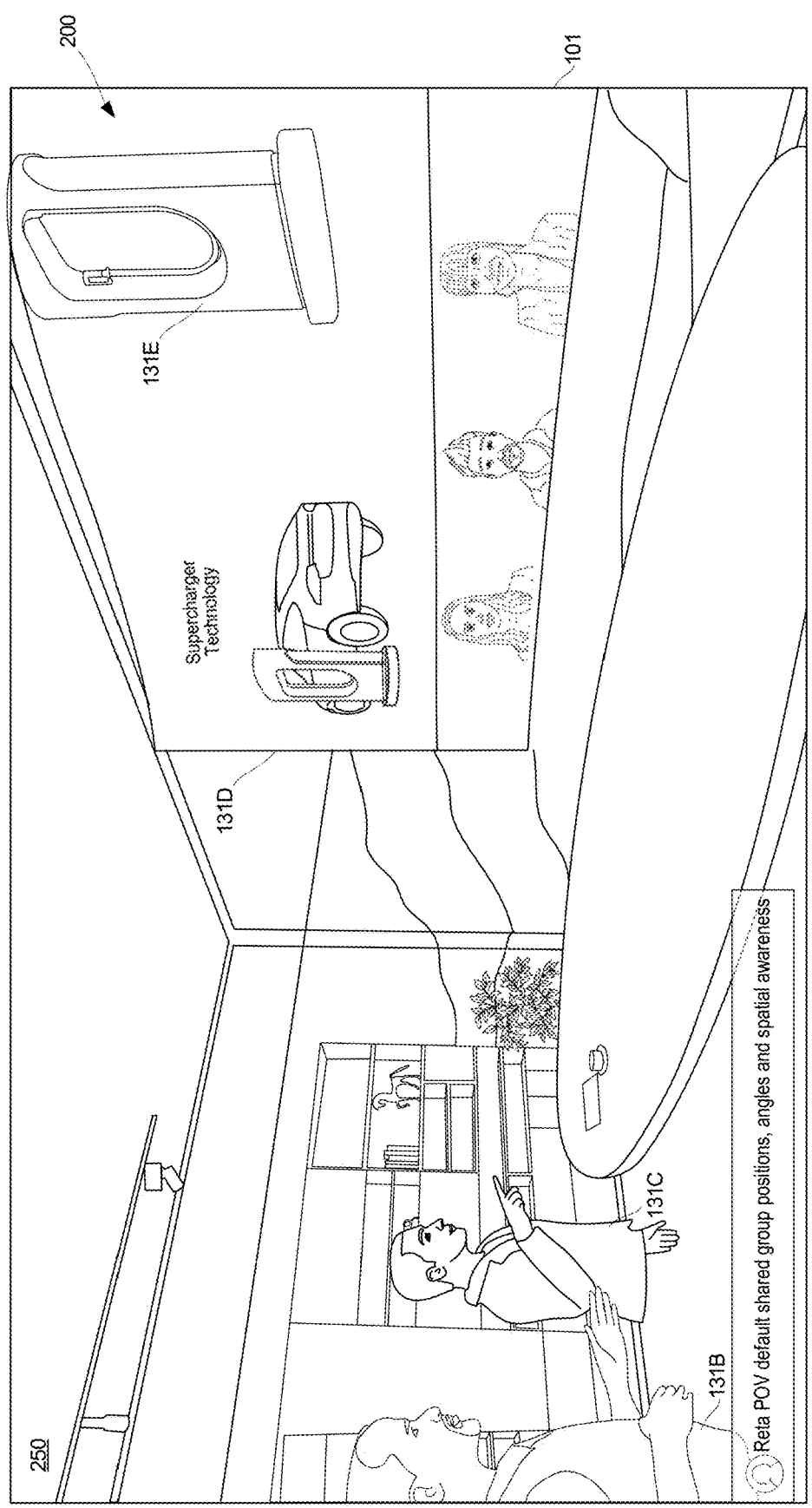
FIG. 3 shows an example of a rendering of a perspective view from a point of view of a selected entity using original model data.
Figure 4:
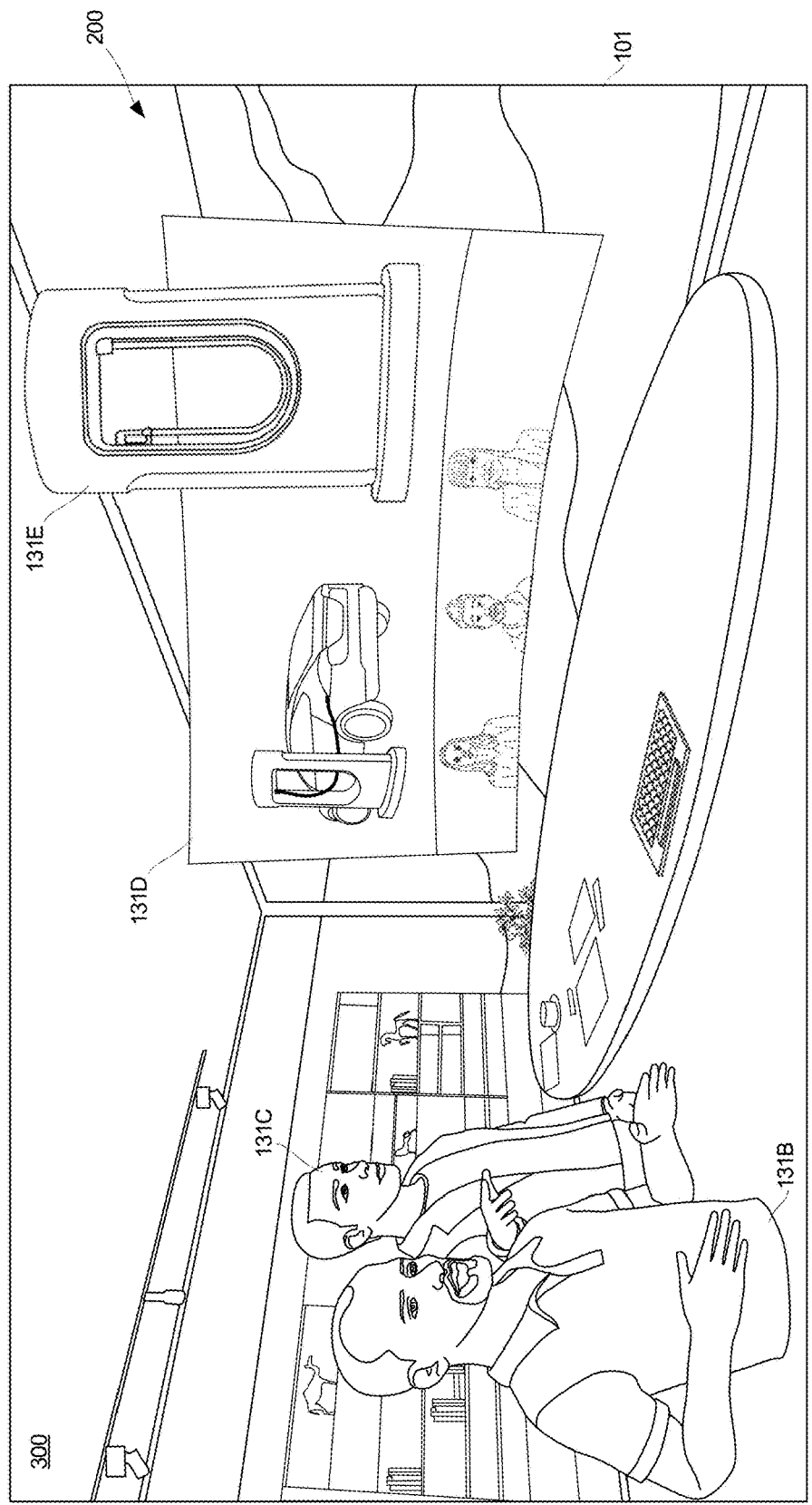
FIG. 4 shows an example of a rendering of a perspective view from a point of view of a selected entity, where the perspective view includes adjustments based on supplemental model data.

In the example of FIG. 1A, a rendering generated from the model data 190 can cause the system to generate a 2D image where a top portion of the second entity would only be partially displayed since the position of the second entity only places a portion of the entity within the first viewing perspective, e.g., only the top third of the avatar's head is displayed since the top third is within the viewing perspective 121A. In addition, given the position of the first point of view 111A and the position and orientation of the second entity 131B, a rendering generated for the viewing perspective 121A would only show the right side of the avatar's face. Thus, a select surface of the second entity, such as the front of the avatar's face, may be obscured or limited in the display since the left half of the face would not be displayed. A select surface of the third entity, such as the front screen of the virtual display screen, may also be limited given that the third entity is oriented away from the first entity and given that the third entity is positioned such that a portion of the third entity is positioned outside of the first viewing perspective 121A. Thus, a rendering of the viewing perspective may crop a portion of an entity given that a portion of the third entity is positioned outside of the first viewing perspective 121A. More detailed examples of renderings of viewing perspectives are shown in FIGS. 2-4.

As described herein, a selection of a target entity 131A from plurality of entities 131 causes the system 100 to modify a viewing perspective 121A originating from a point of view 111A associated with the target entity 131A. In this example, an input causes a selection of the first entity. FIG. 1A shows a state of the model data prior to the selection of an entity. FIG. 1B shows a state of a model data and additional supplemental model data after the selection of an entity.

In some configurations, prior to the selection of a particular entity, the original model data 190 can be used to generate a rendering that is not adjusted, i.e., a rendering is based on the positions and orientations of each entity of the original model data, which may cause one or more surfaces of certain entities to be obstructed or cropped. However, after the selection of a particular entity, e.g., a target entity, the system can generate additional model data 191 to improve the display of the entities of interest. An entity of interest can be an entity that has at least a portion of the entity within the viewing perspective according to the original model data. An example of an entity of interest, also referred to herein as a select entity, includes the second entity if the first entity is selected as the target entity because the second entity is within the viewing perspective of the first entity.

As shown in FIG. 1B, after the selection of the first entity or a selection of the first viewing perspective, the system can generate supplemental model data 191 that has new positions and/or orientations for select entities to improve the display of the entities that are in the viewing perspective. In some configurations, the supplemental model data can give the effect that entities have moved or turned. The new position and/or the new orientation can cause the system to generate a rendering of a viewing perspective such that a select surface, e.g., a display screen surface or an avatar's face, is more prominently shown in a rendering of the perspective view. The new positions and/or orientations for certain entities can increase the display of one or more select surfaces. The generation of the supplemental data can be done in a way such that the original model data stays intact. This allows a view of one user to be modified while the positions of the entities and the views of other users are maintained while the first user controlling the first avatar is modified. These features also allow the system to maintain orientations and positions of each entity to preserve the integrity of the 3D model. Thus, the viewing perspective 121B for the second entity 131B does not change for the user controlling the second entity.

In some configurations, a select entity can also include an entity identified in a user preference. For example, a user preference of the first user controlling the first entity may identify a fourth entity that is not in the user's viewing perspective according to the original model data. In such scenarios, the system may generate supplemental model data 191 that has a new position and/or orientation for that select entity to improve the display of that entity even if is not the viewing perspective according to the original model data. The new position and/or the new orientation can cause the system to generate a rendering of a viewing perspective such that a select surface of that entity, e.g., a display screen surface or an avatar's face, is more prominently shown in a rendering of the perspective view. This can be done without causing a modification to the original data so other user perspective views can be generated while maintaining an orientation and position of each entity to preserve the integrity of the 3D model of the environment.

To achieve the results described herein, the system may access the data structure 190 defining the 3D environment 200, where the data structure 190 defines a position 132 and an orientation 113 for each entity of the plurality of entities 131 of the 3D environment 200, the data structure 190 defines at least one viewing perspective 121 that is based on one or more points of view 111 for individual entities 131 that are selectable for generating custom renderings 300 of the at least one viewing perspective 121 for a computing device 11A of a communication session 604. The orientation of each entity can be defined by one or more matrices or any other data set that can define a vector from a point in space. The point in space can be at the entity position or based on the entity position.

The system can then receive an input indicating a selection of the target entity 131A from plurality of entities 131. The input causes the system 100 to modify a viewing perspective 121A originating from a point of view 111A associated with the target entity 131A. This selection can include a selection of an entity, e.g., an avatar or a virtual room camera, for generating a modified view based on supplemental model data. The input selecting an entity can also include a computer-generated input where a computer may determine that a perspective of a meeting should be from a particular avatar or the input can be provided by a user input such as a voice command, a touch screen command, etc. A computer-controlled input can be triggered by one or more actions. For instance, a meeting may have an agenda and the system can select different entities, or viewing perspectives or points of view, based on the agenda. For instance, in the introduction section of an agenda, the system may generate an input to select a first camera view such as the camera view shown in FIG. 2. Then, during a presentation section of the agenda, the system can generate different inputs to select different viewing perspectives from various avatars. these examples are provided for illustrative purposes and are not to be construed as limiting. It can be appreciated that any type of computer-generated input or a user-generated input can be utilized. In some confirmations, the input can select a perspective view, a point of view, or an associated entity, and the selection of any of these items can mean a selection of the associated entity as a target entity and its associated perspective view. An entity, such as a target entity can be associated with a user and their computer that has permissions to control orientation, position, and/or gestures of the entity.

In response to the input indicating the selection of the target entity, such as the first entity 131A, as shown in the supplemental data of FIG. 1B, the system can generate supplemental model data 191 defining at least one of a new position 133B, 133C or a new orientation 134B, 134C for at least one entity 131B, 131C of the plurality of entities 131. The new position and the new orientation may be applied to any select entity. A selection of a target entity can also mean the selection of a particular point of view or a selection of a viewing perspective, such as the first viewing perspective. The new position and the new orientation can be associated with a user having permissions to control the target entity, e.g., a selected avatar.

For illustrative purposes, the target entity is an entity that is selected by an input, and "entity of interest" is identified by the system in response to a selection of a target entity or a selection of a perspective view or a point of view. Once a target entity is selected based on the input, the system can analyze entities within the virtual environment to identify entities of interest. If one or more entities of interest are identified, the system can generate a new position and/or a new orientation for each of the entities of interest. In some configurations, entities of interest may be identified when any portion of an entity is within the viewing perspective based on the original model data. For instance, in the example of FIG. 1A, the second entity 131B has at least a portion of the entity 131B in the viewing perspective 121A of the first entity 131A, and thus the second entity is selected as an entity of interest for a new position or a new orientation that is to be applied to the supplemental model data 191. If the second entity does not have any portion in the viewing perspective 121A of the first entity 131A, then the second entity is not selected as an entity of interest and a new orientation and a new position is not generated for the entity.

In some configurations, the selection of the entities of interest can be based on one or more criteria. For instance, if a particular entity has more than a threshold portion within a viewing perspective, with another portion of the particular entity outside of the viewing perspective, the system can generate a new orientation and/or a new location for that particular entity. For instance, if a threshold is 50% and 51% of the entity is within the viewing perspective, the system can select that entity as an entity of interest and generate a new position or a new orientation for that entity of interest. However, in this example, if the entity is only 49% within the viewing respective, the system may not select that particular entity as an entity of interest and the system will not generate a new orientation or a new position for that entity. This allows the system to reduce the usage of computing power that is required to generate new positions and new orientations. Thus, if a virtual environment has thousands of entities within a viewing perspective, the system may only change the position or orientation of those objects that are of an interest to a user.

This example is provided for illustrative purposes, and it is to be construed as non-limiting. It can be appreciated that other criteria can be utilized to select an entity as an entity of interest. For instance, a system can select an entity as an entity of interest if that particular entity has less than a threshold portion within a viewing perspective. This type of criteria can bring more objects into a more prominent viewing angle and position when the original model data doesn't allow the user to see enough a particular object. Thus, this system may not generate supplemental model data for objects that has more than a threshold portion within a viewing perspective. The portion that is measured for these determinations can be based on a percentage of overall volume of an entity, a percentage of a select surface of an entity, or any other unit of measure.

The system may also determine if a new orientation is needed. For instance, in the example of FIG. 1A, if the orientation vector of the second entity was directed toward the first entity and only turned away by 15%, the system may not generate a new orientation for that entity. However, if the orientation vector of the second entity was directed away from the first entity or if the orientation vector of the second entity is turned away from the first entity by greater than a threshold degree, e.g., by more than 25%, the system may generate a new orientation for that entity.

With reference to FIG. 1B, the supplemental data can be configured such that a new position, such as a new position 133B, 133C or the new orientation 134B, 134C for the second and third entities 131B, 131C increases a display of at least one select surface of the at least one entity 131B, 131C positioned within the viewing perspective 121A associated with the target entity 131A. Thus, the supplemental model data can be generated to create a new view just for the selected avatar, e.g., the user controlling the target entity, where increasing a display of a select surface means that it shows more of an entity or more of a select part of an entity, e.g., the select surface being the face of an avatar, or a display screen of a virtual display screen, etc.

The examples of the select surfaces are provided for illustrative purposes and are not to be construed as limiting. It can be appreciated that other surfaces of an entity can be selected such as the hands of an avatar or any other portion that is an area of interest. In some configurations, user preferences can define one or more surfaces are of interest to a user and the orientation of other entities may be rotated or re-positioned for the supplemental model data such that the selected surface indicated in the user preferences is displayed more prominently and the rendering of the perspective view. For instance, if preferences of a first user indicate an interest in viewing an engine of a virtual motorcycle, and the original model data shows the motorcycle in the first user's perspective, the system can generate supplemental model data to include an orientation and location of the motorcycle that allows that selected portion, e.g., the engine, to be more prominently displayed to the particular perspective view of the first user.

FIG. 2 through FIG. 4 shows an example of how original model data 190 can be used to display a rendering 250 of a perspective view, and how supplemental model data 191 can be used to display a customized rendering 300 of a perspective view for a particular user without impacting the original model data or impacting perspective views of other users. For illustrative purposes, the perspective views disclosed herein can also be referred to as "views."

FIG. 2 shows an example of a rendering 250 of a perspective view that is based on a virtual room camera having a point of view behind a set of avatars representing users of a communication session. This rendering 250 shows the position and orientation of the entities within a virtual environment 200 based on original model data 190, an example of which is shown in FIG. 1A. In this example, the first entity 131A is a first avatar, the second entity 131B is a second avatar, the third entity 131C is a third avatar, the fourth entity 131D is a virtual screen, and the fifth entity 131E is a model of a product, e.g., a car charger, that is generated from shared content of one of the users. The virtual screen also includes a number of 2D images 211 of other meeting participants. The 2D images can include 2D still images or 2D live video feeds of users.

Aspects of a system 100 are also shown in FIG. 2. This system can be configured to manage a communication session and the system can include a number of computers 11 each corresponding to a number of users 10 or participants 10. The computers can be in the form of desktop computers, head-mounted display units, tablets, mobile phones, etc. As described herein, the system 100 may also include a server and other devices to facilitate a communication session.

The system can generate a user interface 101 showing aspects of the communication session to each of the users. The user interface 101 can include renderings of the three-dimensional (3D) representations of each user, which can include avatars positioned within a 3D virtual environment 200. In this particular example, the user interface includes a 3D rendering 131A of a representation of a first user 10A, a 3D rendering 131B of a representation of a second user 10B, and a 3D rendering 131C of a representation of a third user 10C. The user interface 101 also includes a 2D rendering 211A of a live stream video of a fourth user 10D, 2D rendering 211B of a live stream video of a fifth user 10E, and 2D rendering 211C of a live stream video of a sixth user 10F.

FIG. 3 shows an example of a rendering 250 of a perspective view that is based on a first perspective view 121A from a point of view 111A at a position of a first entity 131A, e.g., an avatar representing a user of a communication session. This rendering 250 shows the position and orientation of the entities within a virtual environment 200 based on original model data 190, e.g., model data that is based on inputs controlling activity of each avatar and shared content. In this example, the second avatar 131B, the third avatar 131C, and the virtual display screen 131D are displayed with the car charger 131E. The virtual screen also includes a number of 2D images 211 of other meeting participants. Given the positions of each entity, the angles of each avatar and the virtual screen and the car charger are not optimal for the first user. For example, the rendering 250 that is based on the original model data only shows half of the face of the second avatar 131B and the third avatar 131C. The virtual screen 131D is also oriented in a manner that may make the viewing of the content more difficult as this rendering 250 shows the virtual screen 131D from the side of the virtual display screen and it is partially cropped from the view. The car charger is also shown from the side, and it is partially cropped from the view. This can lead to missed content in a meeting if items are not optimal angles and the renderings of items are cropped.

To address the positions and angles that are not optimal for particular views, the system can generate adaptive adjustments of perspective views for improving detail awareness for users associated with target entities of a virtual environment. An example of an adapted adjustment for a perspective view is shown in FIG. 4. In this example, a rendering 300 is of a perspective view that is based on a first perspective view 121A from a point of view 111A at a position of a first entity 131A.

This rendering 300 shows the position and orientation of the entities within a virtual environment 200 based on the supplemental model data 191, e.g., the supplemental model data that is generated with new attributes based on a selection of a target entity. In this example, the second avatar 131B, the third avatar 131C, the virtual display screen 131D, and the car charger 131E are displayed using a new position and a new orientation that increases the display of at least one select surface of each entity. As shown, the in front of the display screen is pointed such that it faces the user's point of view more directly, the car charger is also oriented and positioned such that the entire side of the car charger is displayed. The faces of the avatars are also pointed such that they face the first user's point of view more directly. This rendering 300 that is based on the supplemental model data increases the display of the surface of each face of each avatar more prominently versus the rendering 250 that is based on the original model data.

The adjusted display of the rendering 350, e.g., the custom display, can use the supplemental model data 191 defining at least one of a new position 133B, 133C or the new orientation 134B, 134C for at least one entity 131B, 131C, wherein the custom rendering 300 is based on the viewing perspective 121A that originates from the point of view 111A associated with the target entity 131A. The use of the supplemental model data 191 defining at least one of the new positions 133B, 133C or the new orientation 134B, 134C for the at least one entity 131B, 131C is used to generate the custom rendering 300 for the computing device 11A without causing a modification of other perspective views 121B associated with other entities 131B. In some embodiments, this means that the system can create the custom rendering 300 without causing any additional modification to the original model data. This means that the original model data can actually follow movement of the entities and maintain the integrity of the model data for the 3D environment according to people control instead of having a modification of a perspective view cause any changes to the original model.

The adjusted or custom display of the rendering 350 can use the supplemental model data 191 defining at least one of a new position 133B, 133C or the new orientation 134B, 134C for at least one entity 131B, 131C, wherein the custom rendering 300 is based on the viewing perspective 121A that originates from the point of view 111A associated with the target entity 131A. The use of the supplemental model data 191 defining at least one of the new positions 133B, 133C or the new orientation 134B, 134C for the at least one entity 131B, 131C is used to generate the custom rendering 300 for the computing device 11A without causing a modification of other perspective views 121B associated with other entities 131B. In some embodiments, this means that the system can create the custom rendering 300 without causing any additional modification to the original model data. This means that the original model data can actually follow movement of the entities and maintain the integrity of the model data for the 3D environment according to people control instead of having a modification of a perspective view cause any changes to the original model.

The supplemental data can also include differences or offsets between the new orientation and a new position. This allows the system to make real-time adjustments to the supplemental model data as the original model data is modified. For instance, if a user moves in the 3D environment according to an input control, e.g., turns right 10 degrees, the original model data will change the position or orientation of an avatar for that user. Using the data in the supplemental data defining differences or offsets, the system can utilize those differences or offsets to update the supplemental model data. Thus, if the second user provides an input to turn the second entity turns 10 degrees, the system may use an offset to change an orientation of the supplemental model data by 10 degrees or a predetermined fraction of that rotation. Thus, the adjusted view can show movement but the movement can be dampened or biased toward a point of view of the target entity.

Also shown in FIG. 4, a customization of the view can also include adjusting the zoom level for a particular perspective view. In this example, viewing perspective is widened to provide a broader display of the virtual environment. The zoom level can be widened in response to determining that a threshold number of entities have at least a portion of a surface that is cropped in an original view based on the original model data. For example, if the system has a threshold of four entities and there are five entities that have at least a portion of a surface cropped from the original view, the system may broaden the perspective view instead of generating supplemental model data for each object. In addition to determining new values for a position, orientation, or zoom level, the system can also increase the size of an entity. As shown in FIG. 4, given that the two avatars are entities of interest, the system may enlarge the renderings of the entities to draw user focus and awareness two element activity. The increase in the size of an entity can be in response to any of the triggering actions described here in, such as the selection of a target entity.

Figure 5:
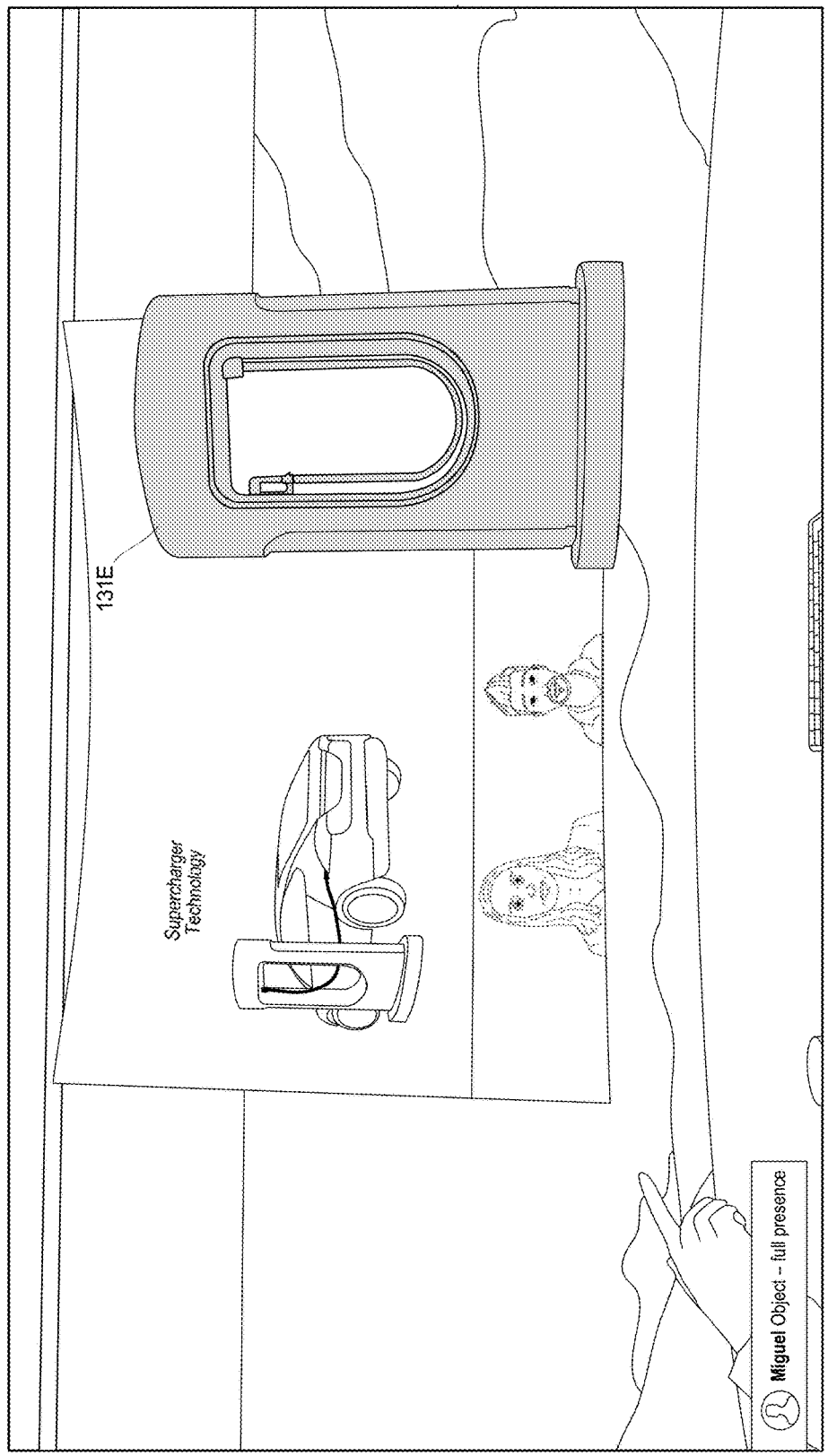
FIG. 5 shows a first stage of an adjustment where a transparency level of an entity is modified to bring awareness to a priority entity.
Figure 6:
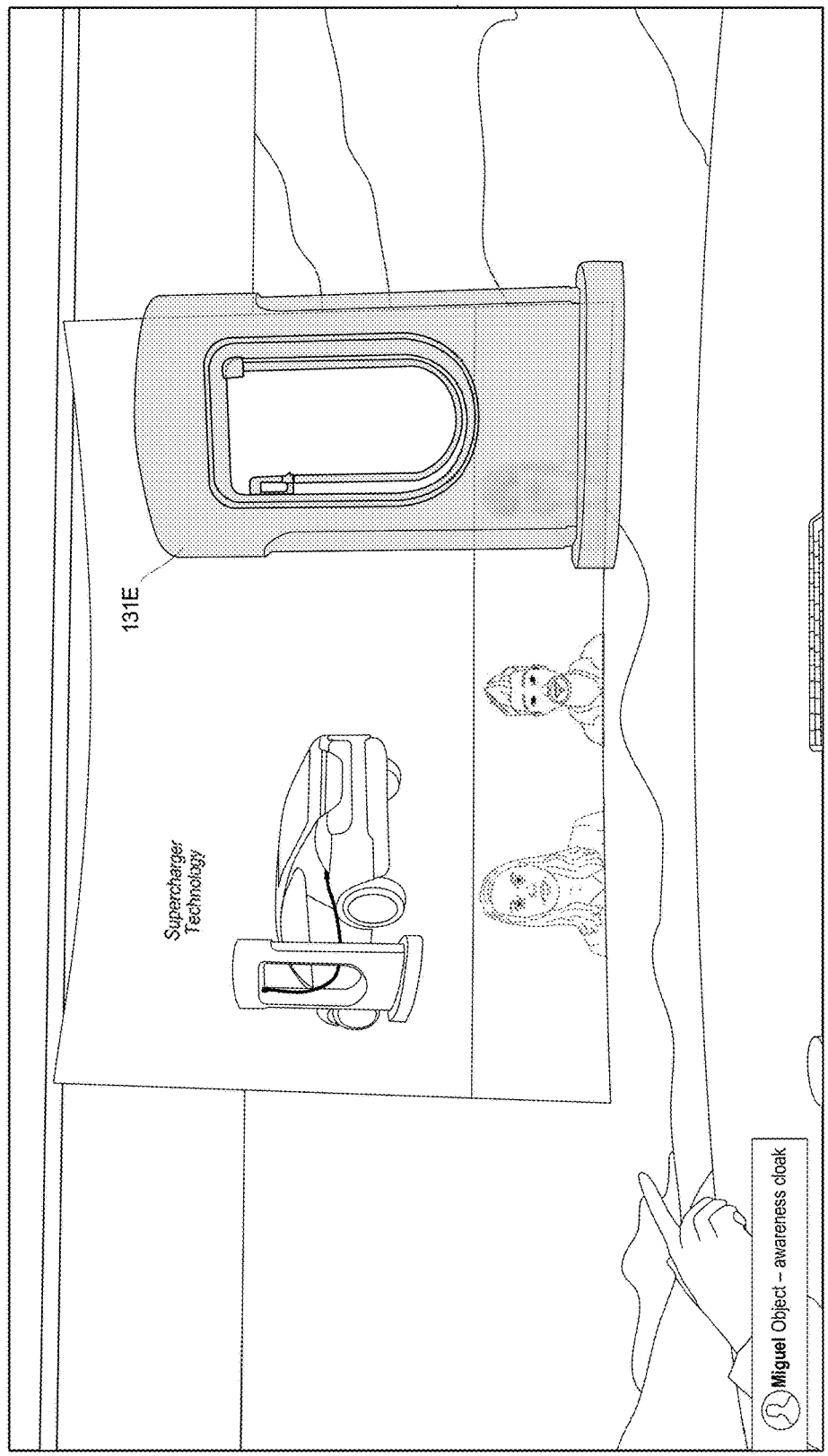
FIG. 6 shows a second stage of an adjustment where a transparency level of an entity is modified to bring awareness to a priority entity.

Referring now to FIGS. 5 through 9, some embodiments can provide a customized view that involves adjusting the transparency level of select entities to bring awareness to other entities that are visually obstructed by the select entities. For instance, as shown in FIG. 4, the system can determine if a particular entity is covering another entity having a threshold priority. In this example, as shown in FIG. 5, a rendering 211C of a 2D video stream of a meeting participant is covered by a 3D entity 131E positioned in front of the virtual display screen. In response to determining that a foreground entity 131E is covering or obscuring a user's view of a background entity 211C having a priority that exceeds a threshold priority, the system can change a transparency level for the foreground entity 131E, or change a transparency level for a portion of the foreground entity 131E.

The system can determine if a particular entity has a priority threshold. A priority threshold can be based on activity or data types associated with the entity. For instance, any shared content such as a live video stream or a shared file that can be rendered in a perspective view as a virtual object can be considered as an entity having a priority threshold. A priority threshold may also be based on a file type of data defining an entity. For instance, if an entity such as the car charger is shared using a 3D AutoCAD file, the system can determine that the charger is a priority entity since it is based on a predetermined file type, e.g., AutoCAD file.

In response to determining that identity is a priority entity, the system can determine if that priority entity is obscured by a display of a second entity. If the priority entity is obscured or covered by the second entity, the system can change the transparency of at least a portion of the second entity to allow for a display of the priority entity. This modification to the user interface is shown in the progression from FIG. 5 to FIG. 8. In response to determining that an entity, e.g., a rendering of a video stream of a participant, is priority and in response to determining that the entity is obscured by a foreground entity 131E, e.g., the charger, the system changes the transparency of the foreground entity 131E to allow a display of the priority object, e.g., the rendering of the video stream. The use can bring the display of the object back by providing an input. The system can also change the transparency level of only a portion of an entity such as the portion shown in FIG. 9. The portion of the entity that is to have a higher transparency level can be sized and shaped to allow a threshold portion of the background entity to be displayed in a rendering of a perspective view. For example, a square is sized and positioned to show the 2D rendering of the video stream of the participant.

In addition to changing the transparency of an entity object, the system can also move the foreground object to allow the display of the background object that is obscured by the foreground object. This movement can be in response to determining that the background entity has a threshold priority and that the foreground entity is blocking the background entity. In the example shown in FIG. 5, the charger can be moved higher to allow the display of the video stream of the participant.

In some configurations, data defining the transparency of objects causing a visual obstruction can be stored in the supplemental model data. This allows the system to generate customized visual perspectives for individual users while maintaining the integrity of the original model 190 and enabling a system to generate visual perspectives for other users that follow the model.

In embodiments, disclosed herein, the system can assign permissions to the supplemental model data for each user so that a user associated with the selected perspective view or the associated target entity can access the supplemental model data that is generated for their associated target entity. These permissions can also restrict other users from accessing the supplemental model data. For example, the first user can be granted permissions to control a first avatar, and that first avatar may be selected by that user as a target entity. In response to that selection, the system can generate supplemental model data for the first user to access to generate their view. This system can also configure permission data to restrict others from accessing that generated supplemental model data. This ensures that the system does not disclose preferences of the first user, such as permission for selecting entities of interest, other view preferences, etc.

Figure 10:
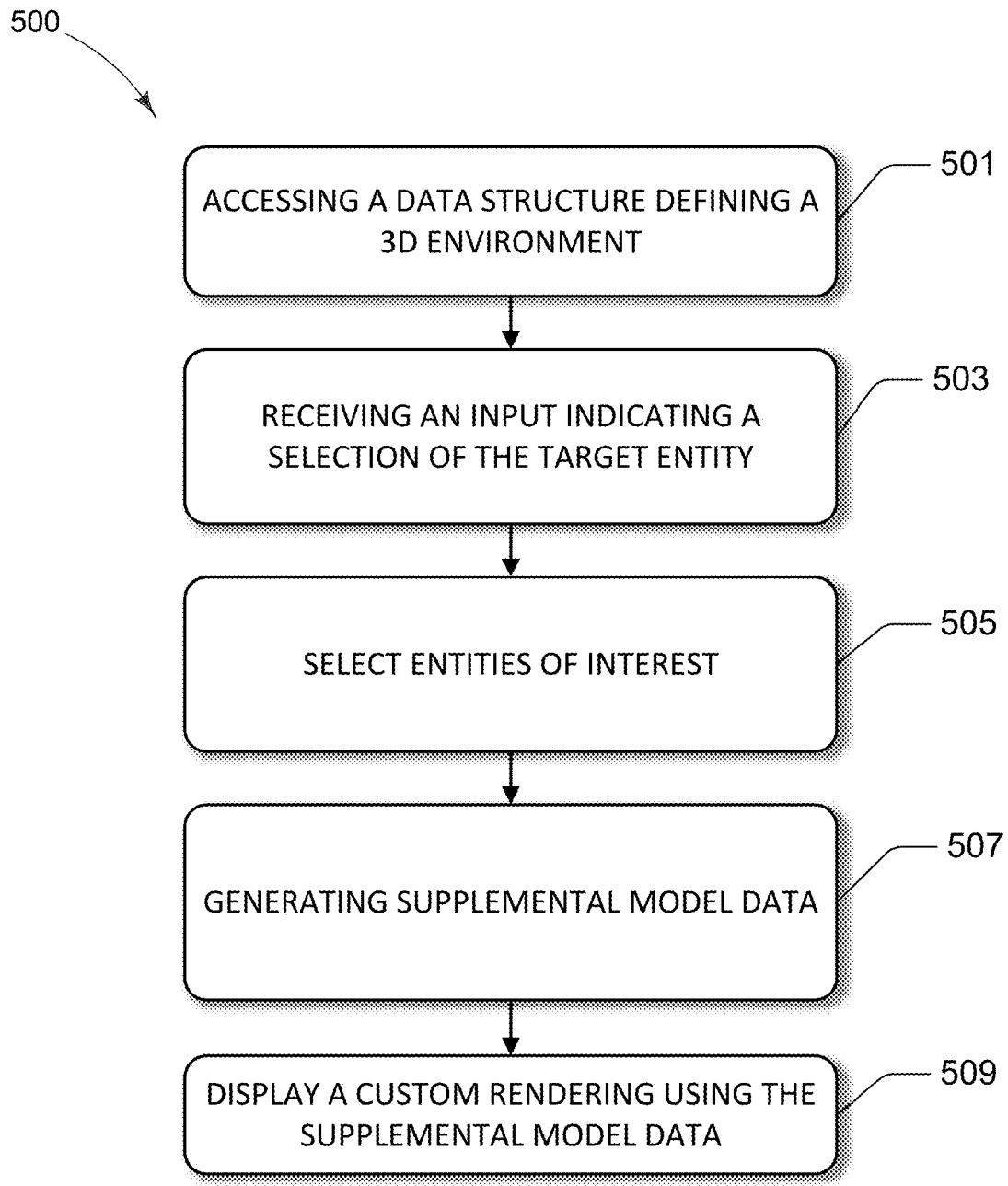
FIG. 10 is a flow diagram showing aspects of a routine that enables features for adjusting a viewing perspective of a 3D environment in response to a selection of a target entity from a plurality of entities positioned within the 3D environment.
Figure 11:
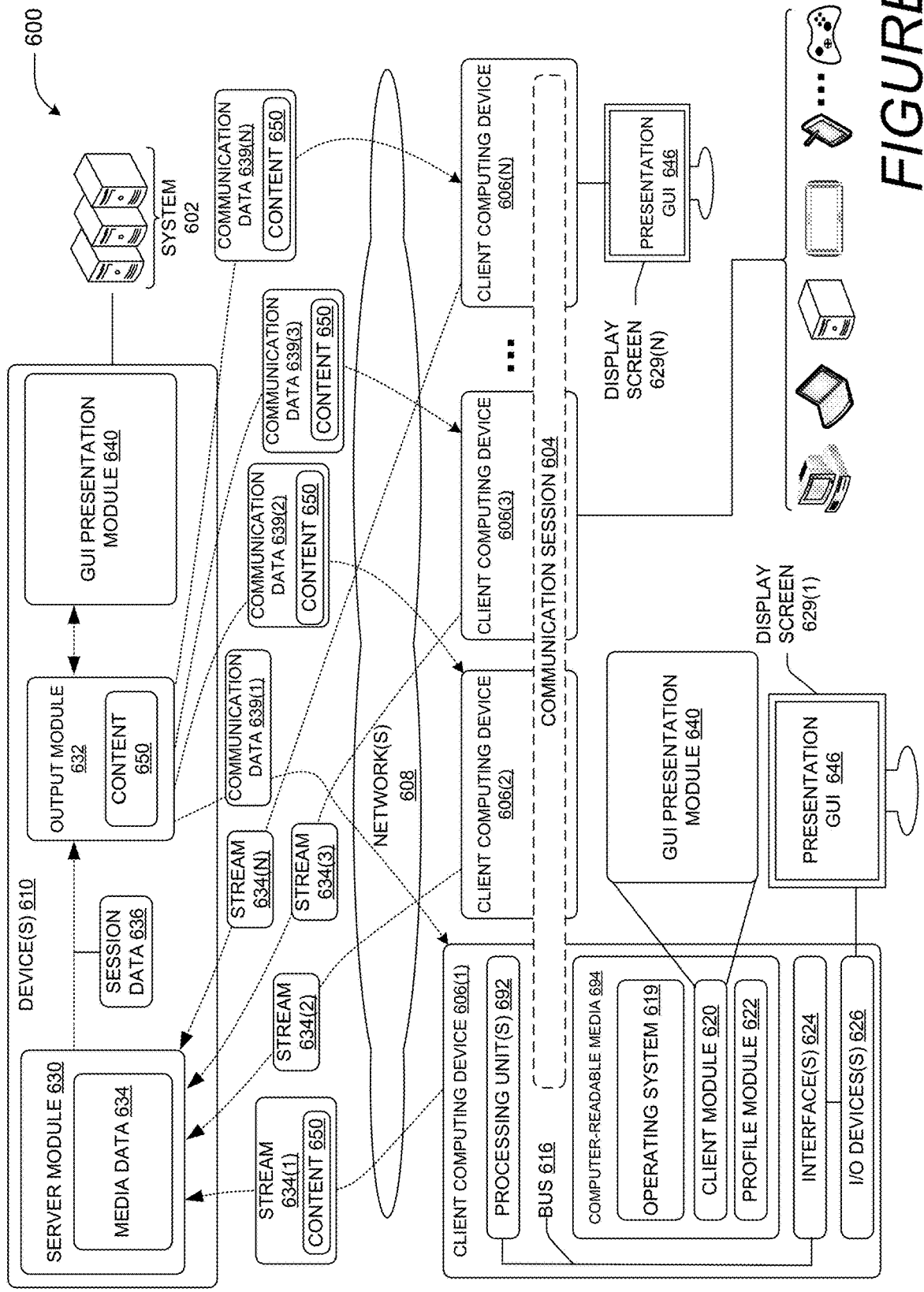
FIG. 11 is a computer architecture diagram illustrating an illustrative computer hardware and software architecture for a computing system capable of implementing aspects of the techniques and technologies presented herein.
Figure 12:
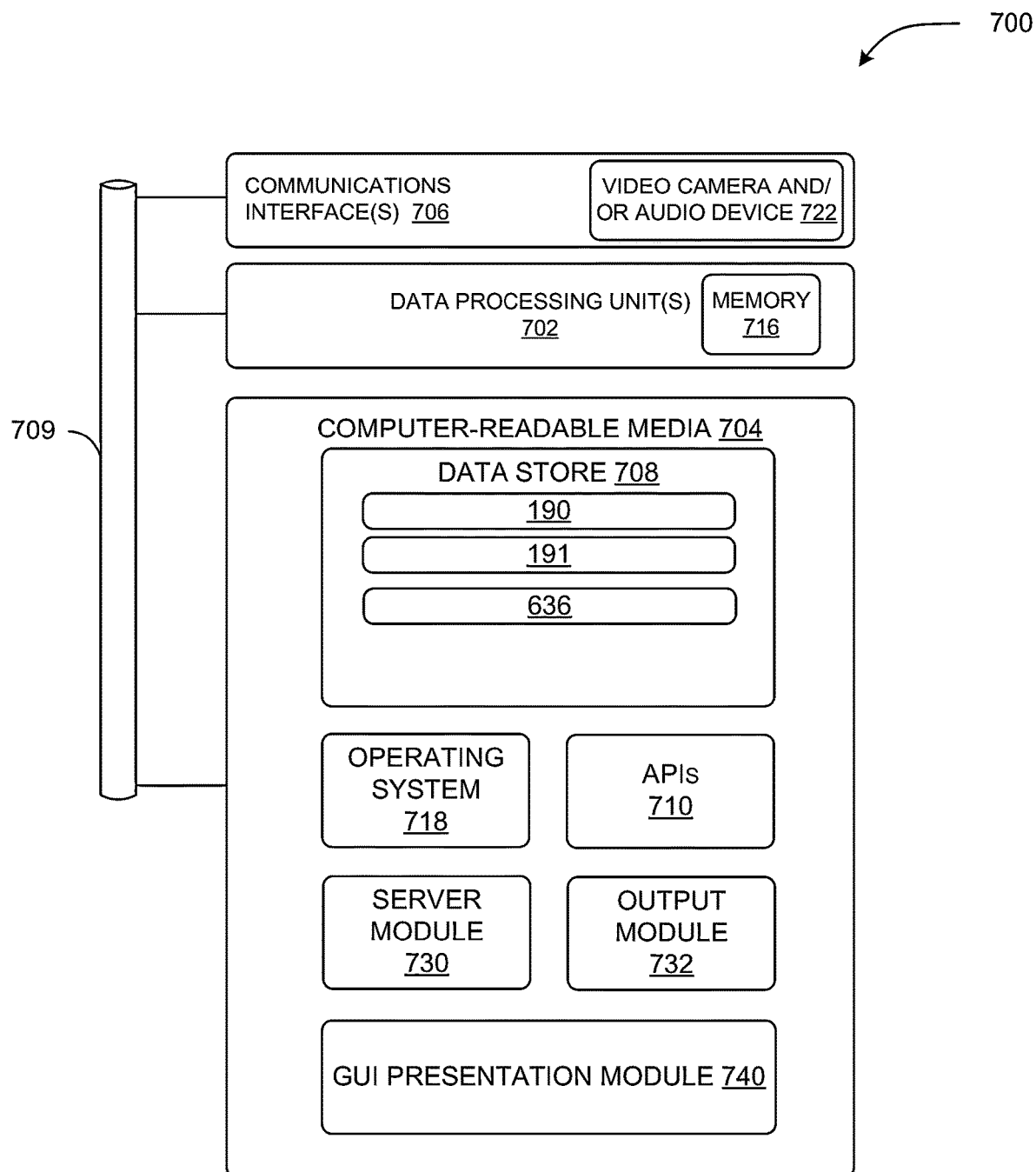
FIG. 12 is a computer architecture diagram illustrating a computing device architecture for a computing device capable of implementing aspects of the techniques and technologies presented herein.

FIG. 10 is a diagram illustrating aspects of a routine 500 for adjusting a viewing perspective 121A associated with a target entity 131A selected from a plurality of entities 131 positioned within a 3D environment 200. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Figure 7:
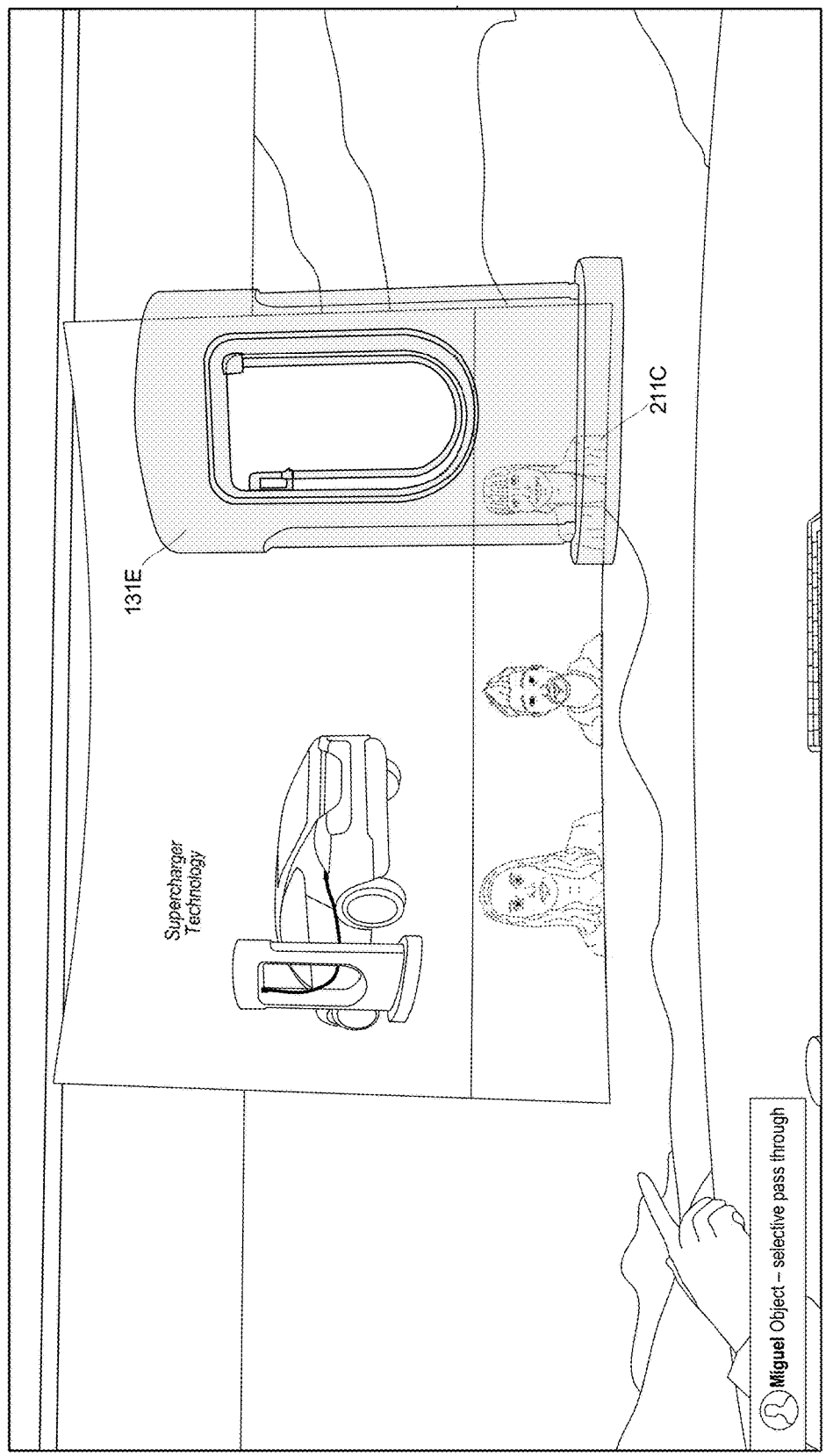
FIG. 7 shows a third stage of an adjustment where a transparency level of an entity is modified to bring awareness to a priority entity.

Additionally, the operations illustrated in FIG. 7 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 500 includes an operation 501 where the system 100 accesses a data structure 190 defining the 3D environment 200, the data structure 190 defines a position 132 and an orientation 113 for each entity of the plurality of entities 131 of the 3D environment 200, the data structure 190 defines at least one viewing perspective 121 that is based on one or more points of view 111 for individual entities 131 that are selectable for generating custom renderings 300 of the at least one viewing perspective 121 for a computing device 11A of a communication session 604.

At operation 503 the system receives an input indicating a selection of the target entity 131A from plurality of entities 131, wherein the input causes the system 100 to modify a viewing perspective 121A originating from a point of view 111A associated with the target entity 131A. This is the selection of an entity, e.g., an avatar or a virtual room camera, for generating the view for a user associated or controlling the entity.

At operation 505, the system selects entities of interest. In some configurations, the selection of the entities of interest can be based on one or more criteria. For instance, if a particular entity has more than a threshold portion within a viewing perspective, with another portion of the particular entity outside of the viewing perspective, the system can generate a new orientation and/or a new location for that particular entity. For instance, if a threshold is 50% and 51% of the entity is within the viewing perspective, the system can select that entity as an entity of interest and generate a new position or a new orientation for that entity of interest. However, in this example, if the entity is only 49% within the viewing respective, the system may not select that particular entity as an entity of interest and the system will not generate a new orientation or a new position for that entity. This allows the system to reduce the usage of computing power that is required to generate new positions and new orientations. Thus, if a virtual environment has thousands of entities within a viewing perspective, the system may only change the position or orientation of those objects that are of an interest to a user. For illustrative purposes, the at least one entity 131B in the claims is one example of an entity of interest.

At operation 507 the system generating supplemental model data 191 defining at least one of a new position 133B, 133C or a new orientation 134B, 134C for at least one entity 131B, 131C, e.g., entities of interest, for the plurality of entities 131. This generation can be in response to the input indicating the selection of the target entity 131A. The new position 133B, 133C or the new orientation 134B, 134C for the at least one entity 131B, 131C increases a display of at least one select surface of the at least one entity 131B, 131C positioned within the viewing perspective 121A associated with the target entity 131A. An example of the supplemental model data is shown in FIG. 1B. The supplemental model data 191 is generated to create the new view just for the selected avatar, e.g., the target entity, for increasing a display of a select surface means that it shows more of an object or more of an entity's face, e.g., the select surface being the face of an avatar. The generation of the supplemental model data does not cause a modification of the data structure 190 defining the 3D environment 200. In some embodiments, during the generation or modification of the supplemental model data, the position 132 and the orientation 113 for each entity of the plurality of entities 131 of the 3D environment 200 defined in the data structure 190 are not modified. System permissions can also restrict the modification of the data structure 190 during the modification or generation of the supplemental model data to preserve the other perspective views 121B associated with the other point of view 111B of the other entities 131B.

At operation 509, the system 100 causes a display of the custom rendering 300 for the computing device 11A using the supplemental model data 191 defining at least one of a new position 133B, 133C or the new orientation 134B, 134C for at least one entity 131B, 131C. The custom rendering 300 is based on the viewing perspective 121A that originates from the point of view 111A associated with the target entity 131A, wherein the use of the supplemental model data 191 defining at least one of the new position 133B, 133C or the new orientation 134B, 134C for the at least one entity 131B, 131C is used to generate the custom rendering 300 for the computing device 11A without causing a modification of other perspective views 121B associated with other entities 131B. FIG. 1B and FIG. 2 shows the new model data 191 and the rendering is based on the new model data while the other model data is maintained to keep the original views of other avatars the same. Although this example suggests that the new perspective view is for the computing device 11A, which is associated with a user controlling the target entity 131A, e.g., the computer controlling the avatar, it can be appreciated that the display of the custom rendering can be communicated to any computing device of any user with appropriate permissions. This includes computers controlled by users having moderator or administrative permissions. This allows a moderator or administrator to select a particular perspective view for select participants of a meeting. This allows the moderator or administrator to switch between different perspective views and also allow the system to automatically correct the position and/or orientation of entities of interest within each perspective view.

Figure 8:
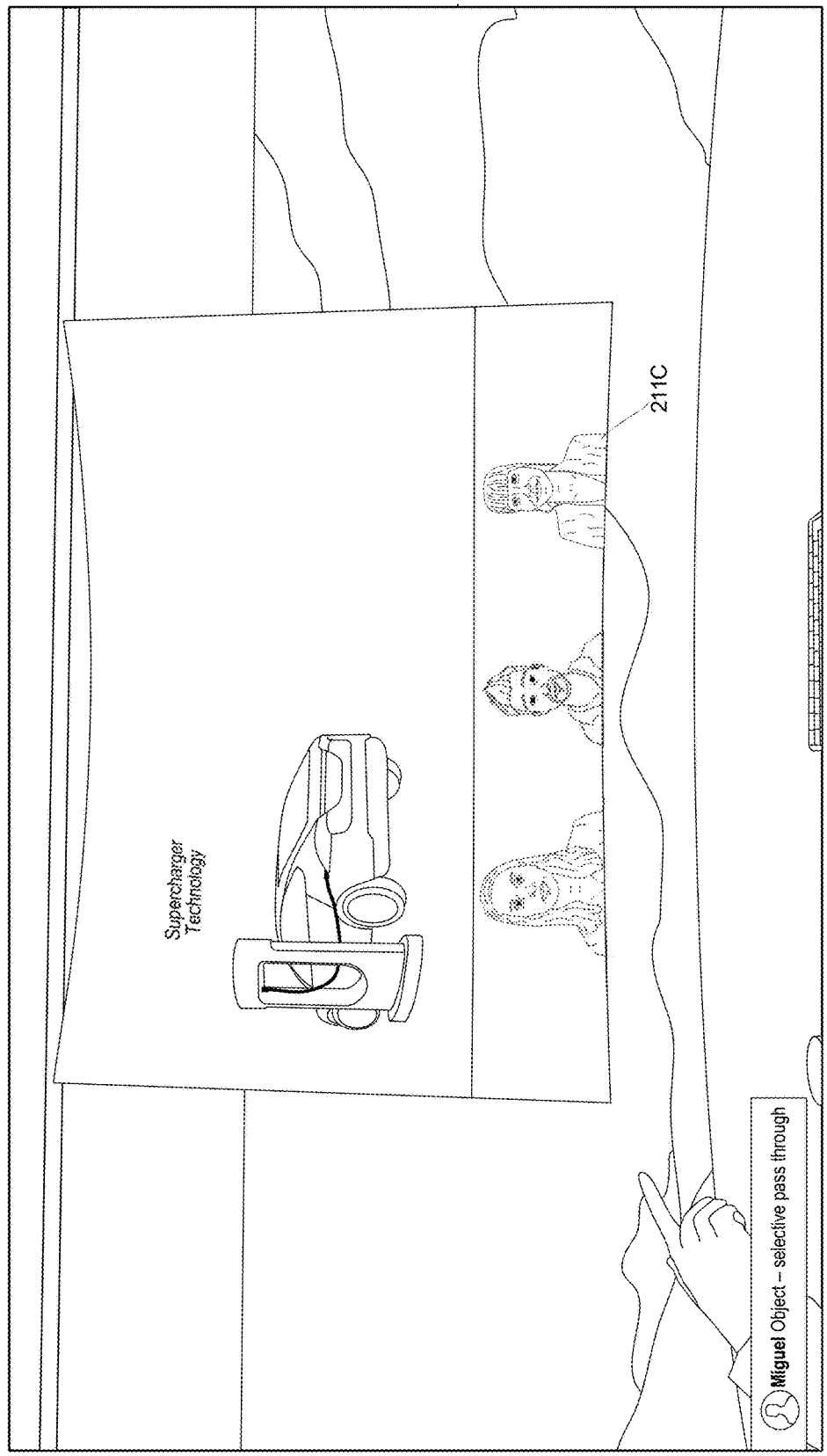
FIG. 8 shows a fourth stage of an adjustment where a transparency level of an entity is modified to bring awareness to a priority entity.

FIG. 8 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 9:
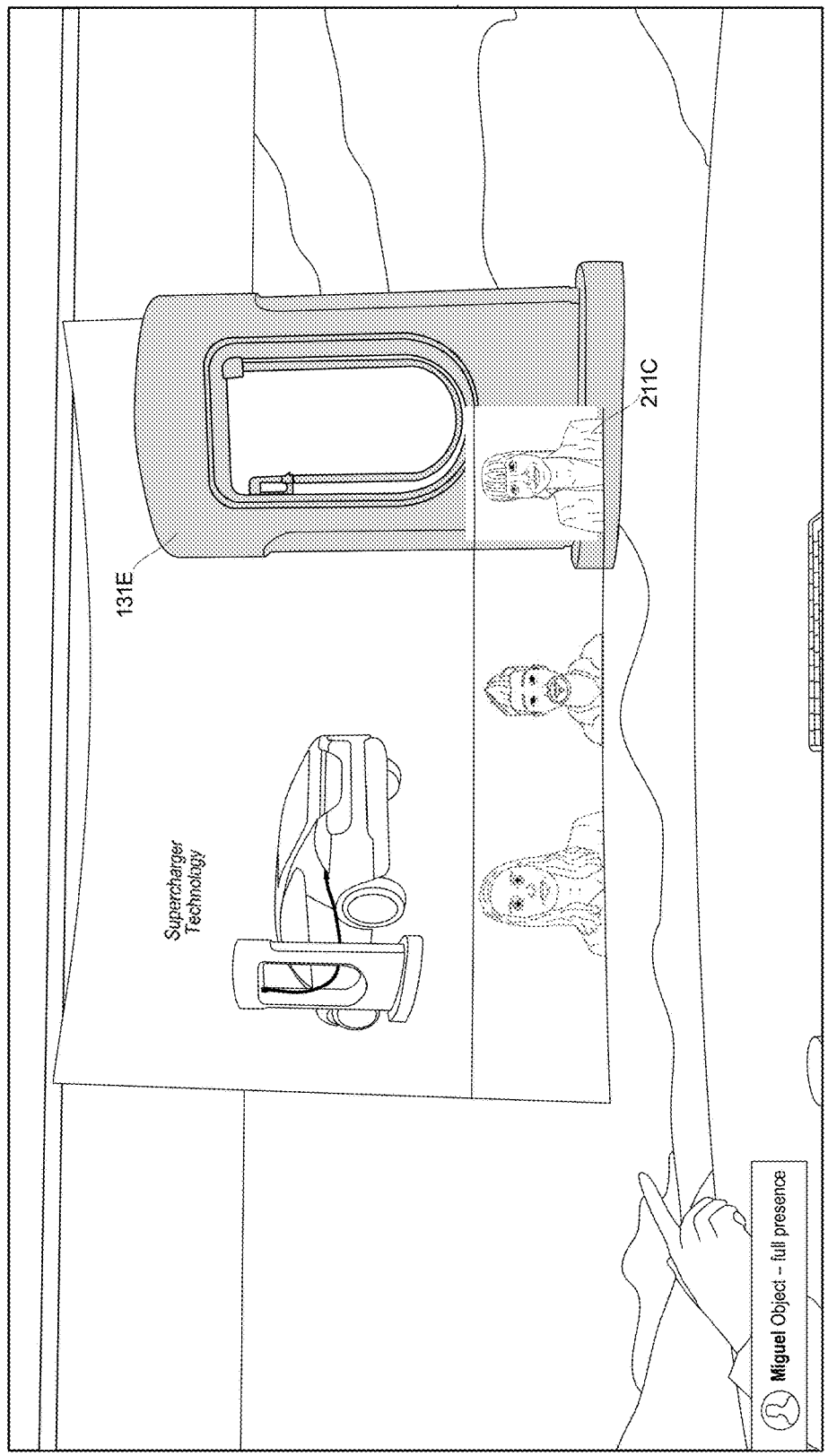
FIG. 9 shows an adjustment where a transparency level of a portion of an entity is modified to bring awareness to a priority entity.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store a data structure 190, the supplemental data 191, and session data 636. The session data 636 can include a total number of participants (e.g., users and/or client computing devices) in a communication session, activity that occurs in the communication session, a list of invitees to the communication session, and/or other data related to when and how the communication session is conducted or hosted. The session data may also include contextual data, such as the content that includes video, audio, or other content for rendering and display on one or more of the display screens. Hardware data 711 can define aspects of any device, such as a number of display screens of a computer. The contextual data can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A computer-implemented method for adjusting a primary viewing perspective associated with a virtual point of view (POV) entity that is one of a plurality of virtual objects positioned within a virtual 3D environment, the method for execution on a system, the method comprising:

accessing a data structure defining the virtual 3D environment, the data structure defines a position and an orientation for each virtual object of the plurality of virtual objects in the virtual 3D environment, the data structure defines at least one viewing perspective that is based on at least one point of view for at least one virtual object of the plurality of virtual objects in the 3D environment, wherein each virtual object of the plurality of virtual objects in the 3D environment is selectable as the POV entity for generating a custom rendering of the primary viewing perspective that originates from a primary point of view associated with the POV entity for a primary computing device of a communication session, wherein the primary computing device of the communication session has permission to control at least one of a position or an orientation of the POV entity;

receiving an input indicating a selection of the POV entity from the plurality of virtual objects, wherein the input causes the system to automatically modify the primary viewing perspective originating from the primary point of view associated with the POV entity without causing a modification to a position or an orientation of the POV entity in the data structure that defines the position and the orientation for each virtual object of the plurality of virtual objects; and in response to the input indicating the selection of the POV entity from the plurality of virtual objects:

automatically identifying at least one other virtual object of the plurality of virtual objects that is within the primary viewing perspective that originates from the primary point of view associated with the POV entity, wherein the at least one other virtual object is not indicated in the input, automatically generating, in response to the selection of the POV entity, supplemental model data defining at least one of a new position or a new orientation for the at least one other virtual object of the plurality of virtual objects that is within the primary viewing perspective that originates from the primary point of view associated with the POV entity, wherein the new position or the new orientation for the at least one other virtual object includes a movement or an orientation change of the at least one other virtual object from a first set of virtual coordinates of the supplemental model data to a second set of virtual coordinates of the supplemental model data, automatically generating, in response to the selection of the POV entity, the custom rendering of the primary viewing perspective that originates from the primary point of view associated with the POV entity using the supplemental model data defining the at least one of the new position or the new orientation for the at least one other virtual object of the plurality of virtual objects, wherein the supplemental model data defining the at least one of the new position or the new orientation for the at least one other virtual object is used to generate the custom rendering for the primary computing device of the communication session without causing a modification of a position or an orientation of the at least one other virtual object rendered in at least one secondary perspective view associated with at least one secondary point of view associated with other virtual objects of the plurality of virtual objects in the virtual 3D environment, automatically causing a display, in response to the selection of the POV entity, of the custom rendering of the primary viewing perspective that originates from the primary point of view associated with the POV entity for the primary computing device of the communication session, and causing a display of the at least one secondary perspective view associated with the at least one secondary point of view associated with the other virtual objects of the plurality of virtual objects in the virtual 3D environment for a secondary computing device, wherein the display of the at least one secondary perspective view is based on the data structure by maintaining a position or an orientation defined in the data structure without applying the modification of the position or the orientation of the at least one other virtual object of the plurality of virtual objects in the virtual 3D environment.

2. The computer-implemented method of claim 1, wherein the supplemental model data defining the at least one of the new position or the new orientation causes an increased display of at least one select surface of the at least one other virtual object in the custom rendering of the primary viewing perspective that originates from the primary point of view associated with the POV entity relative to a display of the at least one select surface of the at least one other virtual object when using the position and the orientation of the at least one other virtual object defined in the data structure, wherein the at least one of the new position or the new orientation causes the increased display of the at least one select surface of the at least one other virtual object without modifying the position and the orientation of the at least one other virtual object that are defined in the data structure.

3. The computer-implemented method of claim 1, wherein the computer-implemented method further comprises automatically identifying the at least one other virtual object of the plurality of virtual objects that is within the primary viewing perspective that originates from the primary point of view associated with the POV entity if, according to the data structure defining the virtual 3D environment, a portion of the at least one other virtual object is within the primary viewing perspective associated with the POV entity, wherein the at least one other virtual object is selected for determining the new position or the new orientation, wherein any of the plurality of virtual objects that are outside the primary viewing perspective associated with the POV entity are not automatically identified for determining the new position or the new orientation.

4. The computer-implemented method of claim 1, wherein the computer-implemented method further comprises automatically identifying at least one other virtual object of the plurality of virtual objects that is within the primary viewing perspective that originates from the primary point of view associated with the POV entity, wherein the at least one other virtual object is automatically identified if, according to the data structure defining the virtual 3D environment, a threshold portion of the at least one other virtual object is within the primary viewing perspective associated with the POV entity, wherein the at least one other virtual object is automatically identified for determining the new position or the new orientation, wherein any of the plurality of virtual objects that have less than the threshold portion in the primary viewing perspective associated with the POV entity are not automatically identified for determining the new position or the new orientation.

5. The computer-implemented method of claim 1, wherein the computer-implemented method further comprises automatically identifying at least one other virtual object of the plurality of virtual objects that is within the primary viewing perspective that originates from the primary point of view associated with the POV entity, wherein the at least one other virtual object is automatically identified if, according to the data structure defining the virtual 3D environment, a threshold portion of the at least one other virtual object is outside the primary viewing perspective associated with the POV entity, wherein the at least one other virtual object is automatically identified for determining the new position or the new orientation, wherein any of the plurality of virtual objects that have less than the threshold portion outside the primary viewing perspective associated with the POV entity are not automatically identified for determining the new position or the new orientation.

6. The computer-implemented method of claim 1, wherein the method further comprises:
   determining that the at least one other virtual object has at least a threshold portion outside of the primary viewing perspective; and
   in response to determining that the at least one other virtual object has at least the threshold portion outside of the primary viewing perspective, modifying a width or a height of the primary viewing perspective to increase the display of at least one surface of the at least one other virtual object.

7. The computer-implemented method of claim 1, wherein permission data allows a user associated with the primary computing device to access the supplemental model data while the permission data restricts other users of at least one secondary computing device from accessing the supplemental model data.

8. The computer-implemented method of claim 1, wherein the generation of the supplemental model data does not cause a modification of the data structure defining the virtual 3D environment, during the generation or modification of the supplemental model data, the position and the orientation for the plurality of virtual objects in the virtual 3D environment defined in the data structure are not modified, wherein system permissions restrict the modification of the data structure during the modification or generation of the supplemental model data to preserve the at least one secondary perspective view associated with the at least one secondary point of view associated with the other virtual objects of the plurality of virtual objects in the virtual 3D environment.

9. The computer-implemented method of claim 1, wherein prior to the input, the data structure stores an original position and an original orientation for the at least one other virtual object, wherein the original position and the original orientation for the at least one other virtual object are maintained for the at least one secondary perspective view associated with the at least one secondary point of view associated with the other virtual objects of the plurality of virtual objects in the virtual 3D environment during the display of the custom rendering for the primary computing device using the supplemental model data defining the at least one of the new position or the new orientation for the at least one entity other virtual object.

10. A computing device for adjusting a primary viewing perspective associated with a virtual point of view (POV) entity selected from a plurality of virtual objects positioned within a virtual 3D environment, comprising:
   one or more processing units of a system; and
   a computer-readable storage medium having encoded thereon computer-executable instructions to cause the one or more processing units to:
   access a data structure defining the virtual 3D environment, the data structure defines a position and an orientation for each virtual object of the plurality of virtual objects in the virtual 3D environment, the data structure defines at least one viewing perspective that is based on at least one point of view for at least one virtual object of the plurality of virtual objects in the 3D environment, wherein each virtual object of the plurality of virtual objects in the 3D environment is selectable as the POV entity for generating a custom rendering of the primary viewing perspective that originates from a primary point of view associated with the POV entity for a primary computing device of a communication session, wherein the primary computing device of the communication session has permission to control at least one of a position or an orientation of the POV entity;
   receive an input indicating a selection of the POV entity from the plurality of virtual objects, wherein the input causes the system to automatically modify the primary viewing perspective originating from the primary point of view associated with the POV entity without causing a modification to a position or an orientation of the POV entity in the data structure that defines the position and the orientation for each virtual object of the plurality of virtual objects; and
   in response to the input indicating the selection of the POV entity from the plurality of virtual objects:
      automatically identify at least one other virtual object of the plurality of virtual objects that is within the primary viewing perspective that originates from the primary point of view associated with the POV entity, wherein the at least one other virtual object is not indicated in the input,
      automatically generate, in response to the selection of the POV entity, supplemental model data defining at least one of a new position or a new orientation for the at least one other virtual object of the plurality of virtual objects that is within the primary viewing perspective that originates from the primary point of view associated with the POV entity, wherein the new position or the new orientation for the at least one other virtual object, includes a movement or an orientation change of the at least one other virtual object from a first set of virtual coordinates of the supplemental model data to a second set of virtual coordinates of the supplemental model data,
      automatically generate, in response to the selection of the POV entity, the custom rendering of the primary viewing perspective that originates from the primary point of view associated with the POV entity using the supplemental data defining the at least one of the new position or the new orientation for the at least one other virtual object of the plurality of virtual objects, wherein the supplemental model data defining the at least one of the new position or the new orientation for the at least one other virtual object is used to generate the custom rendering for the primary computing device of the communication session without causing a modification of a position or an orientation of the at least one other virtual object rendered in at least one secondary perspective view associated with at least one secondary point of view associated with other virtual objects of the plurality of virtual objects in the virtual 3D environment, automatically cause a display, in response to the selection of the POV entity, of the custom rendering of the primary viewing perspective that originates from the primary point of view associated with the POV entity for the primary computing device of the communication session, and cause a display of the at least one secondary perspective view associated with the at least one secondary point of view associated with the other virtual objects of the plurality of virtual objects in the virtual 3D environment for a secondary computing device, wherein the display of the at least one secondary perspective view is based on the data structure by maintaining a position or an orientation defined in the data structure without applying the modification of the position or the orientation of the at least one other virtual object of the plurality of virtual objects in the virtual 3D environment.

11. The computing device of claim 10, wherein the supplemental model data defining the at least one of the new position or the new orientation causes an increased display of at least one select surface of the at least one other virtual object in the custom rendering of the primary viewing perspective that originates from the primary point of view associated with the POV entity relative to a display of the at least one select surface of the at least one other virtual object when using the position and the orientation of the at least one other virtual object defined in the data structure, wherein the at least one of the new position or the new orientation causes the increased display of the at least one select surface of the at least one other virtual object without modifying the position and the orientation of the at least one other virtual object defined in the data structure.

12. The computing device of claim 10, wherein the computer-executable instructions further cause the one or more processing units to automatically identify the at least one other virtual object of the plurality of virtual objects that is within the primary viewing perspective that originates from the primary point of view associated with the POV entity if, according to the data structure defining the virtual 3D environment, a portion of the at least one other virtual object is within the primary viewing perspective associated with the POV entity, wherein the at least one other virtual object is automatically identified for determining the new position or the new orientation, wherein any of the plurality of virtual objects that are outside the primary viewing perspective associated with the POV entity are not automatically identified for determining the new position or the new orientation.

13. The computing device of claim 10, wherein the computer-executable instructions further cause the one or more processing units to automatically identify at least one other virtual object of the plurality of virtual objects that is within the primary viewing perspective that originates from the primary point of view associated with the POV entity, wherein the at least one other virtual object is automatically identified if, according to the data structure defining the virtual 3D environment, a threshold portion of the at least one other virtual object is within the primary viewing perspective associated with the POV entity, wherein the at least one other virtual object is automatically identified for determining the new position or the new orientation, wherein any of the plurality of virtual objects that have less than the threshold portion in the primary viewing perspective associated with the POV entity are not automatically identified for determining the new position or the new orientation.

14. The computing device of claim 10, wherein the computer-executable instructions further cause the one or more processing units to:

determine that the at least one other virtual object has at least a threshold portion outside of the primary viewing perspective; and in response to determining that the at least one other virtual object has at least the threshold portion outside of the primary viewing perspective, modifying a width or a height of the primary viewing perspective to increase the display of at least one surface of the at least one other virtual object.

15. The computing device of claim 10, wherein permission data allows a user associated with the primary computing device to access the supplemental model data while the permission data restricts other users of at least one secondary computing device from accessing the supplemental model data.

16. A computer-readable storage device having encoded thereon computer-executable instructions to cause one or more processing units of a system to adjust a primary viewing perspective associated with a virtual point of view (POV) entity selected from a plurality of virtual objects positioned within a virtual 3D environment, the computer-executable instructions cause the one or more processing units to:

access a data structure defining the virtual 3D environment, the data structure defines a position and an orientation for each virtual object of the plurality of virtual objects in the virtual 3D environment, the data structure defines at least one viewing perspective that is based on at least one point of view for at least one virtual object of the plurality of virtual objects in the 3D environment, wherein each virtual object of the plurality of virtual objects in the 3D environment is selectable as the POV entity for generating a custom rendering of the primary viewing perspective that originates from a primary point of view associated with the POV entity for a primary computing device of a communication session, wherein the primary computing device of the communication session has permission to control at least one of a position or an orientation of the POV entity;

receive an input indicating a selection of the POV entity from the plurality of virtual objects, wherein the input causes the system to automatically modify the primary viewing perspective originating from the primary point of view associated with the POV entity without causing a modification to a position or an orientation of the POV entity in the data structure that defines the position and the orientation for each virtual object of the plurality of virtual objects; and in response to the input indicating the selection of the POV entity from the plurality of virtual objects:

automatically identify at least one other virtual object of the plurality of virtual objects that is within the primary viewing perspective that originates from the primary point of view associated with the POV entity, wherein the at least one other virtual object is not indicated in the input, automatically generate, in response to the selection of the POV entity, supplemental model data defining at least one of a new position or a new orientation for the at least one other virtual object of the plurality of virtual objects that is within the primary viewing perspective that originates from the primary point of view associated with the POV entity, wherein the new position or the new orientation for the at least one other virtual object, includes a movement or an orientation change of the at least one other virtual object from a first set of virtual coordinates of the supplemental model data to a second set of virtual coordinates of the supplemental model data, automatically generate, in response to the selection of the POV entity, the custom rendering of the primary viewing perspective that originates from the primary point of view associated with the POV entity using the supplemental data defining the at least one of the new position or the new orientation for the at least one other virtual object of the plurality of virtual objects, wherein the supplemental model data defining the at least one of the new position or the new orientation for the at least one other virtual object is used to generate the custom rendering for the primary computing device of the communication session without causing a modification of a position or an orientation of the at least one other virtual object rendered in at least one secondary perspective view associated with at least one secondary point of view associated with other virtual objects of the plurality of virtual objects in the virtual 3D environment, automatically cause a display, in response to the selection of the POV entity, of the custom rendering of the primary viewing perspective that originates from the primary point of view associated with the POV entity for the primary computing device of the communication session, and cause a display of the at least one secondary perspective view associated with the at least one secondary point of view associated with the other virtual objects of the plurality of virtual objects in the virtual 3D environment for a secondary computing device, wherein the display of the at least one secondary perspective view is based on the data structure by maintaining a position or an orientation defined in the data structure without applying the modification of the position or the orientation of the at least one other virtual object of the plurality of virtual objects in the virtual 3D environment.

17. The computer-readable storage device of claim 16, wherein the supplemental model data defining the at least one of the new position or the new orientation causes an increased display of at least one select surface of the at least one other virtual object in the custom rendering of the primary viewing perspective that originates from the primary point of view associated with the POV entity relative to a display of the at least one select surface of the at least one other virtual object when using the position and the orientation of the at least one other virtual object defined in the data structure, wherein the at least one of the new position or the new orientation causes the increased display of the at least one select surface of the at least one other virtual object without modifying the position and the orientation of the at least one other virtual object defined in the data structure.

18. The computer-readable storage device of claim 16, wherein the computer-executable instructions further cause the one or more processing units to automatically identify the at least one other virtual object of the plurality of virtual objects that is within the primary viewing perspective that originates from the primary point of view associated with the POV entity if, according to the data structure defining the virtual 3D environment, a portion of the at least one other virtual object is within the primary viewing perspective associated with the POV entity, wherein the at least one other virtual object is automatically identified for determining the new position or the new orientation, wherein any of the plurality of virtual objects that are outside the primary viewing perspective associated with the POV entity are not automatically identified for determining the new position or the new orientation.

19. The computer-readable storage device of claim 16, wherein the computer-executable instructions further cause the one or more processing units to automatically identify at least one other virtual object of the plurality of virtual objects that is within the primary viewing perspective that originates from the primary point of view associated with the POV entity, wherein the at least one other virtual object is automatically identified if, according to the data structure defining the virtual 3D environment, a threshold portion of the at least one other virtual object is within the primary viewing perspective associated with the POV entity, wherein the at least one other virtual object is automatically identified for determining the new position or the new orientation, wherein any of the plurality of virtual objects that have less than the threshold portion in the primary viewing perspective associated with the POV entity are not automatically identified for determining the new position or the new orientation.

20. The computer-readable storage device of claim 16, wherein the computer-executable instructions further cause the one or more processing units to automatically identify the at least one other virtual object of the plurality of virtual objects that is within the primary viewing perspective that originates from the primary point of view associated with the POV entity if, according to the data structure defining the virtual 3D environment, a threshold portion of the at least one other virtual object is outside the primary viewing perspective associated with the POV entity, wherein the at least one other virtual object is automatically identified for determining the new position or the new orientation, wherein any of the plurality of virtual objects that have less than the threshold portion outside the primary viewing perspective associated with the POV entity are not automatically identified for determining the new position or the new orientation.

* * * * *